(12) United States Patent
Benedetti et al.

(10) Patent No.: US 6,209,341 B1
(45) Date of Patent: Apr. 3, 2001

(54) DRY-ICE CONTAINER, AND PROCESS AND PLANT FOR MANUFACTURING A DRY-ICE CONTAINER

(75) Inventors: Xavier Benedetti, Paris; José Buil, Fresnes, both of (FR)

(73) Assignee: L'Air Liquide, Societe Anonyme pour l'Etude et l'Exploitation des Procedes George Claude, Paris (FR)

( * ) Notice: Subject to any disclaimer, the term of this patent is extended or adjusted under 35 U.S.C. 154(b) by 0 days.

(21) Appl. No.: 09/374,999

(22) Filed: Aug. 16, 1999

(30) Foreign Application Priority Data

Sep. 29, 1998 (FR) .................................................. 98 12167

(51) Int. Cl.⁷ ...................................................... F25D 3/12
(52) U.S. Cl. .............................................. 62/388; 62/293
(58) Field of Search ............................... 62/384, 388, 293

(56) References Cited

U.S. PATENT DOCUMENTS

| | | | |
|---|---|---|---|
| 1,903,171 | * 3/1933 | Cordley | 62/388 |
| 3,561,226 | * 2/1971 | Rubin | 62/388 |
| 3,971,231 | * 7/1976 | Derry | 62/388 |
| 4,404,818 | * 9/1983 | Franklin, Jr. | 62/384 |
| 4,916,922 | 4/1990 | Mullens . | |

FOREIGN PATENT DOCUMENTS

| | | |
|---|---|---|
| 196 29 034 | 1/1998 | (DE) . |
| 2 518 237 | 6/1983 | (FR) . |
| 2 604 243 | 3/1988 | (FR) . |
| 2 257 501 | 1/1993 | (GB) . |

* cited by examiner

Primary Examiner—Ronald Capossela
(74) Attorney, Agent, or Firm—Burns, Doane, Swecker & Mathis, L.L.P.

(57) ABSTRACT

A dry-ice container comprising:
  a casing and, in this casing;
  carbon dioxide, part of which is in a solid state and another part of which is in a gaseous state, wherein the casing comprises at least one passage for spontaneous escape of carbon dioxide in the gaseous state.

20 Claims, 4 Drawing Sheets

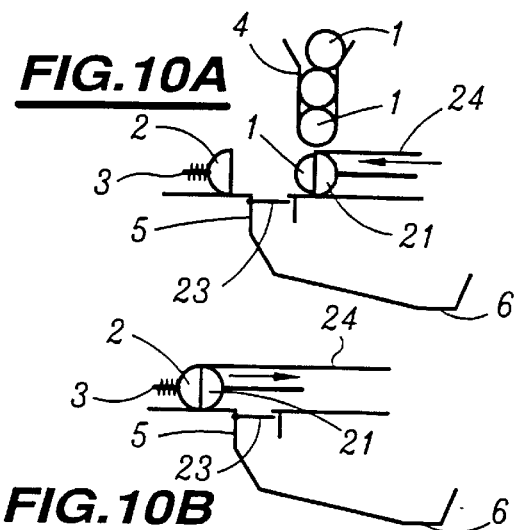
FIG.10A
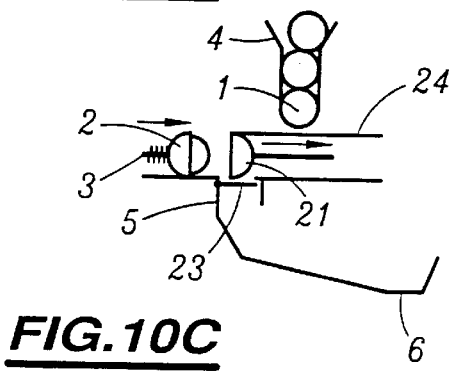
FIG.10B
FIG.10C
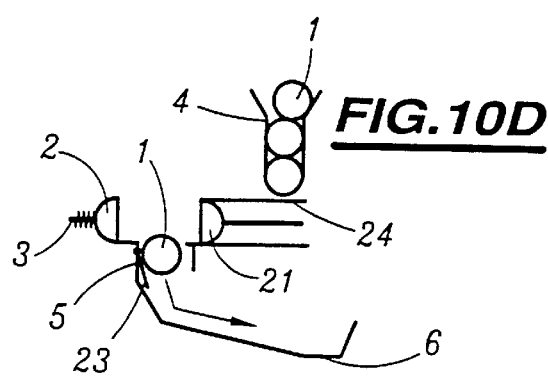
FIG.10D
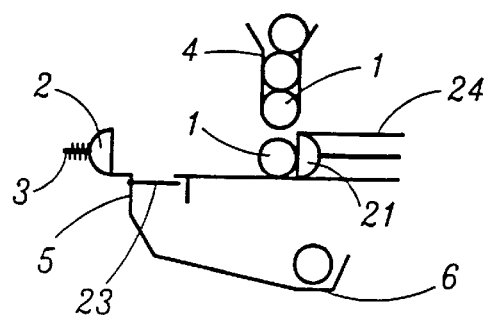
FIG.10E
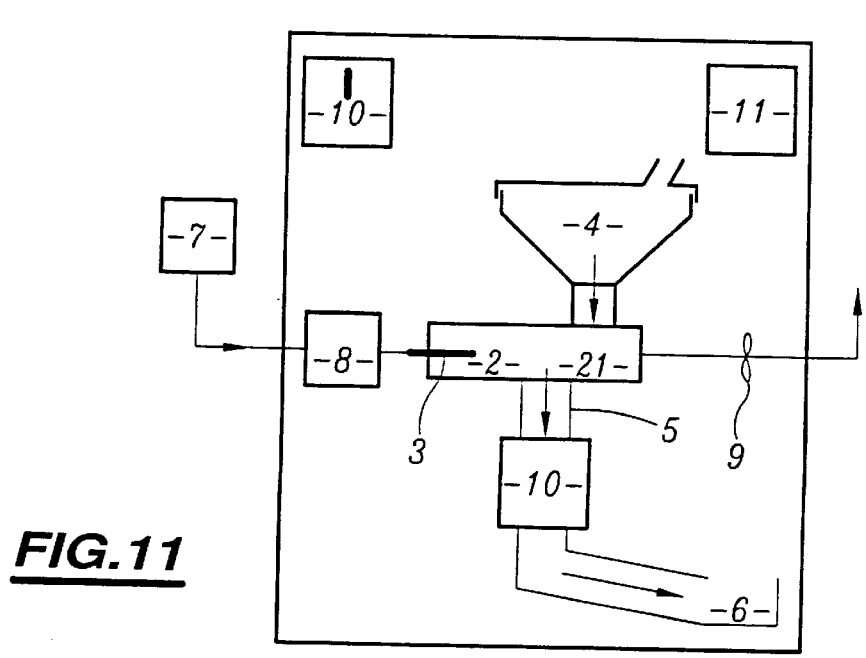
FIG.11

# DRY-ICE CONTAINER, AND PROCESS AND PLANT FOR MANUFACTURING A DRY-ICE CONTAINER

BACKGROUND OF THE INVENTION (i) Field of the Invention

The present invention relates to a dry-ice container in the form of a casing at least partially filled with dry ice, as well as to a process and a plant for manufacturing a dry-ice container.

(ii) Description of Related Art

It is known that frozen or deep-frozen products, especially foodstuffs that have to be kept at low temperature (about −20° C. or less) without interrupting their refrigeration system from the time they are frozen or deep-frozen until the time they are used, require warehouses, means of transport and shops provided with refrigeration plants which at the present for example in the case of non-motorized transport, it is impossible to transport the products without removing them from the refrigeration plant where they are stored, and the risks of a significant temperature rise are considerable if the environmental conditions are unfavorable; in order to prevent such a temperature rise when transporting them, for example after their sale "in bulk," it is usual to place the frozen or deep-frozen products in an ice environment, the ice being given to the person acquiring the products by the supplier, generally free of charge. A certain lack of appreciation of refrigeration techniques on the part of suppliers and customers, together with the fact that the refrigerating power of ice is known to be relatively low, usually results in them intentionally overestimating the amount of ice necessary, as a precaution, and this results in significant unnecessary expense for the supplier. One could try to replace the ice with a relatively inexpensive product having a better refrigerating power, but it turns out that the pure and simple replacement of ice with such products may be dangerous because of the very low temperature at which these products would have to be used (approximately −80° C. in the case of dry ice) and because of the risk of skin lesions that their use would occasion, unless further precautions are taken.

SUMMARY AND OBJECTS OF THE INVENTION

The object of the invention is to remedy these drawbacks and to create a product in the form of a dry-ice container comprising a casing and a dose of dry ice placed inside this casing, which is inexpensive, in particular because of the simplicity of its process and its manufacturing plant, and because of the possibility of automating this process and this plant in the immediate vicinity of the site of use.

For this purpose, the invention relates to a dry-ice container, which comprises a casing and, in this casing, carbon dioxide, part of which is in the solid state and another part of which is in the gaseous state, wherein the casing has at least one passage for the spontaneous escape of carbon dioxide in the gaseous state.

The container may also have one or more of the following characteristics:

the casing has at least one passage for the insertion of a carbon dioxide injection device suitable for transferring carbon dioxide contained in a carbon dioxide supply into the casing;

the passage for inserting the injection device is unidirectional;

the passage for the spontaneous escape of carbon dioxide in the gaseous state also forms the passage for inserting a carbon dioxide injection device;

the casing has several passages formed from perforations for the spontaneous escape of carbon dioxide in the gaseous state;

the casing is made of a porous material, this material having pores forming passages for the spontaneous escape of carbon dioxide in the gaseous state.

The invention also relates to a process for manufacturing a dry-ice container comprising a casing and, in this casing, carbon dioxide, part of which is in the solid state, wherein a casing defining an internal space is housed in a housing in which the casing is held, so as to face a device for the injection of carbon dioxide in the liquid state, the device being connected to a supply of carbon dioxide under pressure in the liquid state, the casing and the injection device are made to come together by moving at least one of them, the movement then continuing until at least one end region of the injection device is in the internal space of the casing, the injection device passing through the casing in a passage of the latter, the coming-together movement is stopped, carbon dioxide in the liquid state is transferred through the injection device from the supply to the internal space where the carbon dioxide in the liquid state is made to pass partly into the pulverulent solid state and partly into the gaseous state, and, as the internal space is gradually filled with the pulverulent solid, the gas phase escapes, then the transfer of carbon dioxide in the liquid state is stopped, the end region of the injection device is removed from the internal space, the casing and the injection device are moved apart, and the casing containing carbon dioxide in the solid state, forming the dry-ice container, is discharged and the excess gas phase is allowed to escape via at least one passage in the casing.

The process may also include one or more of the following characteristics:

in order to continue the movement until at least one end region of the injection device is in the internal space of the casing, the injection device is inserted into a passage in the casing;

in order to continue the movement until at least one end region of the injection device is in the internal space of the casing, the casing is cut into by means of the injection device in order to create a passage in the casing and the injection device is inserted into this passage.

The invention also relates to a plant for the manufacture of a dry-ice container comprising a casing and, in this casing, carbon dioxide, part of which is in the solid state, wherein it comprises a device for the injection of carbon dioxide in the liquid state into the casing and this injection device comprises a tubular body along which a channel extends, a head carried by the body, in order to pass through a passage in the casing, and holes suitable for making the channel communicate with the inside of the casing when the head is at least partially in the casing.

The plant may also include one or more of the following characteristics:

the injection device includes a cutting tool for cutting into the casing, for the purpose of producing a through-passage therein, and a channel for gaseous carbon dioxide to escape;

the plant includes a box, one wall of which carries the injection device, and a drawer that can move between an open position for putting in the casing, for the purpose of filling it, and a closed position for filling the casing, in which at least part of the head of the injection device is inside the casing;

the plant includes a panel suitable for forming a bottom for a sliding drawer, the panel itself sliding independently of the drawer;

the plant includes a well for discharging the containers, an upper part of which well is selectively closed off or exposed by a pivoting panel;

the plant includes a hopper for feeding casings, and the drawer carries a cover fastened to the back of the latter and having an approximately horizontal wall which extends level with the top of the drawer and is suitable for closing off the base of the hopper, except when the drawer is in the open position;

the carbon dioxide injection device is connected to a carbon dioxide supply via a solenoid valve, the residual gaseous carbon dioxide in the plant is extracted therefrom via an extractor and the containers are sent to a pan from a discharge well via a counting apparatus.

Further characteristics and advantages of the invention will appear on reading the description which follows of embodiments and methods of implementing the invention, these being given by way of nonlimiting examples, illustrated by the appended drawings.

BRIEF DESCRIPTION OF THE DRAWINGS

FIG. 10A to 10E show diagrammatically successive phases in the manufacture of a container according to the invention and more specifically of the filling of a casing with dry ice for a container according to a third embodiment; and FIG. 11 is a block diagram of a plant according to the invention.

Figure 1:
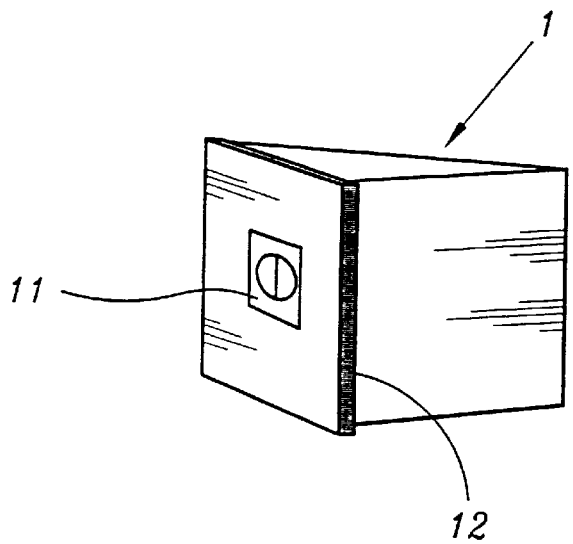
FIG. 1 is a diagrammatic perspective view of a first embodiment of a container according to the invention.

DETAILED DESCRIPTION OF PREFERRED EMBODIMENTS:

The product according to the invention, intended to replace ice as the refrigerating agent in order to accompany, for example in their transportation, products which have to be temporarily removed from a refrigeration plant, is a dry-ice container.

This container comprises a casing 1 and, in this casing, carbon dioxide, part of which is in the solid state, and more specifically in the form a dry ice, and another part of which is in the gaseous state. Since the container is intended to be used in the ambient environment, the dry ice sublimes in the casing and it is necessary to allow the carbon dioxide in the gaseous state that is formed to escape, otherwise the pressure in the casing would increase until the latter bursts; for the purpose of allowing spontaneous escape of the superfluous gaseous carbon dioxide, the casing includes one or more escape passages.

The casing must also include at least one passage for the insertion of a carbon dioxide injection device, which injection device makes it possible to transfer carbon dioxide contained in a carbon dioxide supply, to which it is connected, into the casing; this same passage may in some cases serve for the gas to escape, as will be seen below.

The carbon dioxide supply is, for example, a bottle of carbon dioxide under pressure in the liquid state; when the liquid carbon dioxide under pressure released by means of a solenoid valve and transferred by way of the injection device penetrates the casing, it expands at atmospheric pressure, thereby forming a solid in pulverulent form, known by the name dry ice, at a temperature very much less than 0° C., about 80° C., and carbon dioxide in the gaseous state. More specifically, consultation of the Mollier diagram shows that a given amount of liquid carbon dioxide under a pressure of 20 bars is therefor transformed into 53% gas and 47% solid.

Insofar as arrangements are made to allow the gas phase here to escape via the escape passage(s), it is possible to completely fill the casing with dry ice and the pressure at which the initially pulverulent carbon dioxide builds up in the casing causes the mass of powder to be compacted, which powder assumes a very consistent state without, however, reaching the state of ice (which corresponds to a pressure of about 200 bar at least).

It is possible to design the casing 1 in various forms and, if it is made of a flexible material it is necessary, on the one hand, for it to be sufficiently strong to withstand the pressure of the carbon dioxide when it is being filled and, on the other hand, sufficiently thermally insulating in order to prevent any risk of burning by the cold when handling it; these two properties may be obtained by choosing a sufficiently large thickness of material; if the container is intended to be used in the food sector, the material chosen must, of course, be also suitable for this use (paper, cardboard or polyethylene).

In one embodiment, the casing 1 is made of filter or porous paper, the air permeability of which is between 200 and 4000 l/m²/s. The passages for the spontaneous escape of carbon dioxide in the gaseous state are then the pores in the paper forming the casing, while the dry ice is retained in the casing. In this embodiment, the casing advantageously has, initially, a single through-hole and fastened to the casing is a one-way valve 11, for example with panels, which is placed so as to close off the through-hole until it is inserted into a carbon dioxide injection device, as will be explained below.

Geometrically, this casing can have various shapes, for example an approximately prismatic shape of triangular cross section (FIG. 1) with an attached plane base 12 made of board through which the through-hole extends, which base is provided with the valve 11 and has two projecting or slightly lifted parallel edges allowing it to be installed in slideways (FIGS. 3 and 4), in the manner of a vacuum cleaner bag, or else a parallelepipedal shape (FIG. 2) or a spherical shape (FIG. 10A to 10E) making it easier to fit into a frame of corresponding shape, for the purpose of filling it. As a variant, the through-hole and its one-way valve may be replaced by a simple prescoring 13 consisting of an incision or of two incisions in the form of a cross in one of the faces of the casing 1. In both cases, the casing 1 may not be porous, but the passages for the spontaneous escape of carbon dioxide in the gaseous state consist of perforations 14 made in the casing before or during the filling operation; these perforations may, for example, be circular and have a diameter of about 4 mm (FIG. 2).

In another embodiment, the casing, which may geometrically have the same shape as previously, is not initially provided with a valve or with a prescoring for the insertion of the carbon dioxide injection device, but the passage for this device is created by a tool with which the device itself is provided, which is forcibly inserted into the casing (the mechanical properties of which are suitably chosen), as will be seen below.

As the casing is gradually filled, the gaseous carbon dioxide can also escape, not via pores or perforations in the casing, but via means specially provided for this purpose in the injection device, as will also be seen below, the gas when escaping, after filling, via the passage where previously the carbon dioxide injection device had been inserted. This characteristic is particularly well suited to the embodiment in which the carbon dioxide injection device creates its own passage, since preferably the casing in this case does not have pores or perforations allowing significant escape of carbon dioxide in the gaseous state so as not to compromise its rigidity while it is being punctured.

Figure 2:
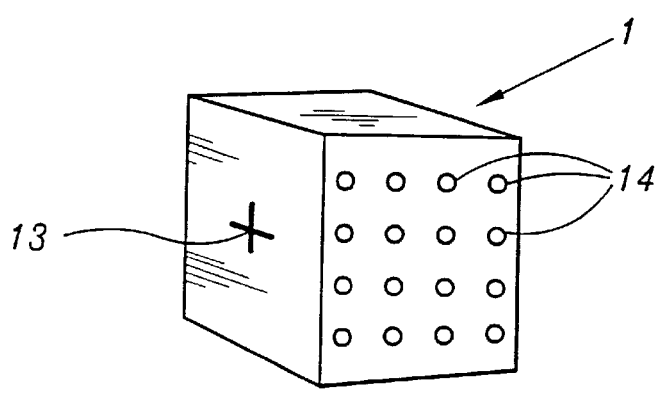
FIG. 2 is a diagrammatic perspective view of a second embodiment of a container according to the invention.
Figure 4:
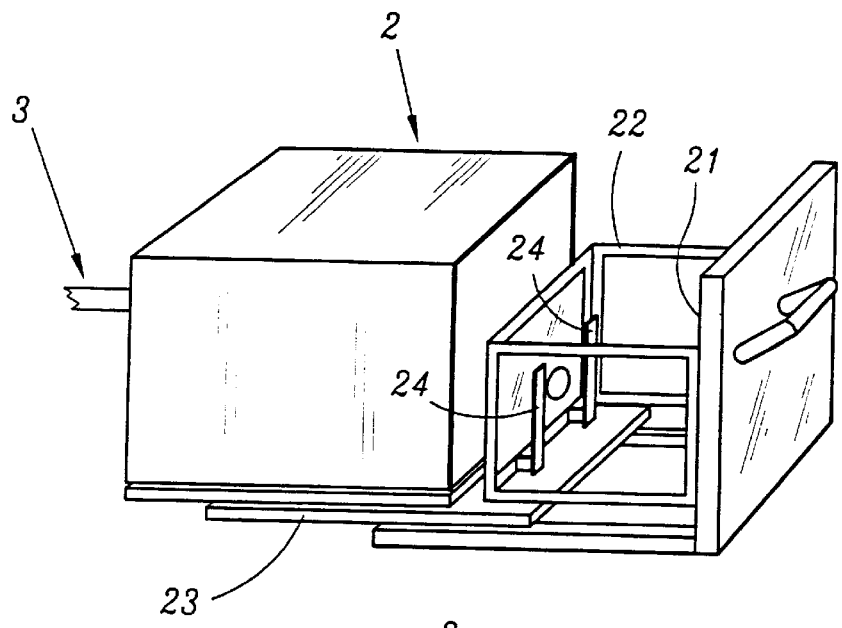
FIG. 4 is a diagrammatic perspective view of an apparatus forming part of a plant according to the invention, for a casing according to the embodiment in FIG. 1, in a position for receiving the casing.
Figure 5:
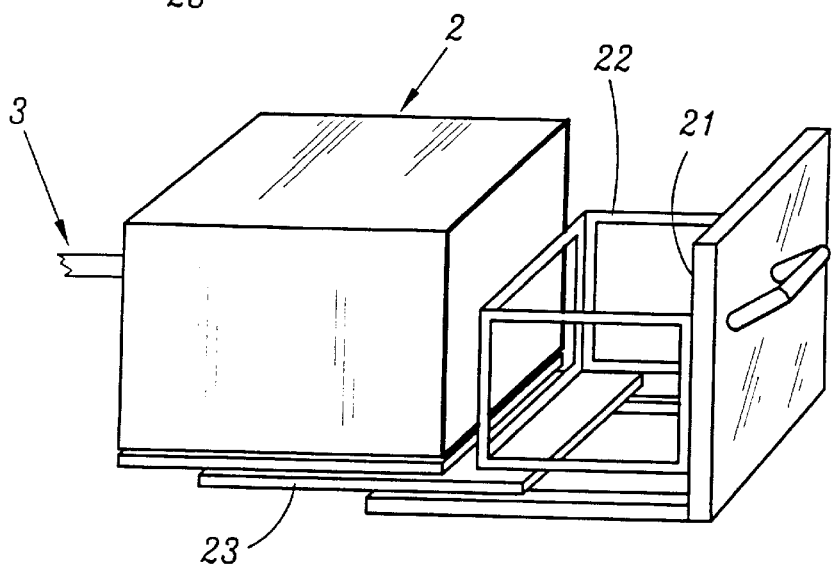
FIG. 5 is a diagrammatic perspective view of an apparatus forming part of a plant according to the invention, for a casing according to the embodiment in FIG. 2, in a position for receiving the casing.
Figure 6:
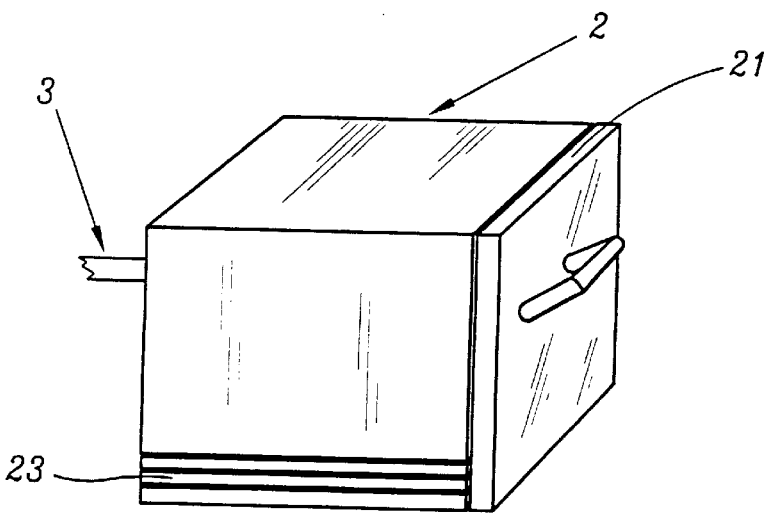
FIG. 6 is a diagrammatic perspective view of the apparatuses in FIGS. 5 and 6 in a position for filling the casing with dry ice.

The casings shown in particular in FIGS. 1 and 2 may be filled in a filling box 2, such as the one in FIGS. 4 to 6, a rear wall of which, in this case approximately vertical, carries the carbon dioxide injection device 3, which box is designed to receive a sliding drawer 21 with which is associated a frame 22 of shape suitable for the casings 1 to be able to be immobilized therein.

More specifically, the drawer 21 is able to move between an open position, in which a casing is introduced for the purpose of filling it and the casing filled with dry ice forming the dry-ice container is then discharged (FIGS. 4 and 5 corresponding respectively to the casings in FIGS. 1 and 2), and a closed position in which the casing is filled (FIG. 6). For this purpose, the injection device 3 is made in the form of a tube or cannula which extends approximately perpendicular to the rear wall of the box 2 and one end of which, having three injection holes, is inside the box, and the sliding movement of the drawer 21 is a to-and-fro straight translational movement in the direction in which the injection device 3 extends. An approximately horizontal panel 23 forming a bottom is itself mounted so as to slide in the same direction as the drawer 21, independently of the latter. Since in the open position of the drawer, for introducing the casing, the frame 22 is above a well for discharging the containers (this not being shown in FIGS. 4 to 6), the bottom 23 is then moved under the frame 22 so as to support the casing and to prevent it from dropping into the discharge well; when the drawer is actuated toward the closed position, the bottom 23 is pushed by the front face of the drawer inside the box; at the end of the closure movement, the casing 1 comes into contact with the injection device 3 and, the movement continuing, the head of the latter penetrates the casing, passing through the valve or the prescoring in the casing, or else, by itself creating its passage, depending on the embodiment, the liquid carbon dioxide is injected into the casing, forming dry ice and gas, and then the intake of carbon dioxide is stopped; next, the drawer is moved back toward the open position while the bottom 23 remains inside the box, and thus, then the drawer is in the completely open position, the dry-ice container drops under gravity into the discharge well. In the embodiments in FIGS. 4 to 6, the frame 22 has a parallelepipedal shape.

Figure 3:
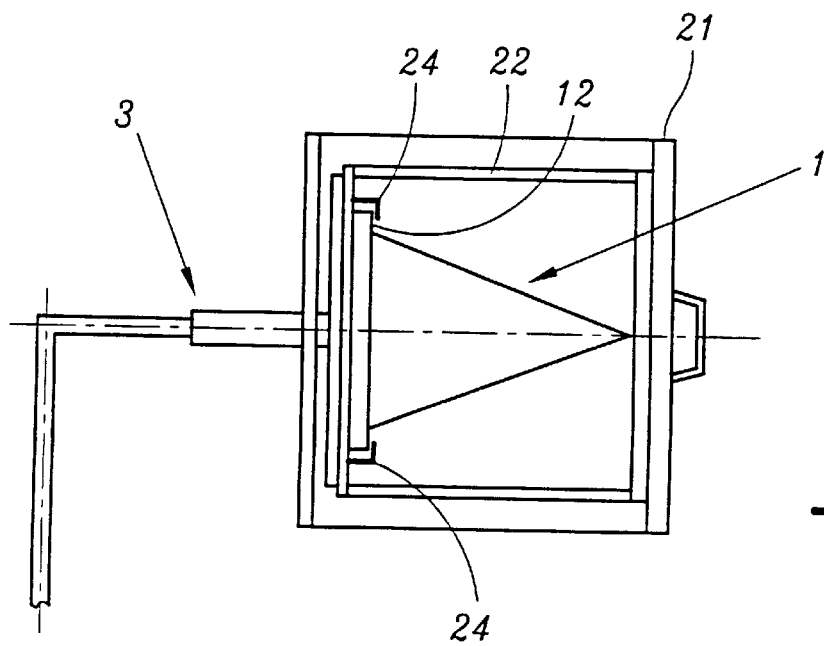
FIG. 3 is a top view showing diagrammatically one phase of the manufacture of a container according to FIG. 1 (the phase of filling a casing with dry ice)

In the embodiment in FIGS. 3 and 4, the drawer 21 has an approximately vertical rear wall near which two bars forming a slideway 24 extend, also vertically, the base of which slideway is fixed to the base of the frame 22.

Thus, a casing like that in FIG. 1, which is placed above the frame 22 when the drawer 21 is in the open position so that its attached base 12 is in alignment with the space between the slideways 24 and the rear wall of the drawer, can, by a vertical translational movement, be housed in the frame by being applied, by its base, against or in the immediate vicinity of this rear wall; in this embodiment, the rear wall of the drawer is pierced by a through-hold facing that in the casing 1 so as to allow passage of the injection device 3.

In the embodiment in FIG. 5, the frame 21 has approximately the same shape as the casing in FIG. 2 that it must house, with slightly greater dimensions, and it is not necessary for the drawer 21 to have a rear wall.

Figure 7:
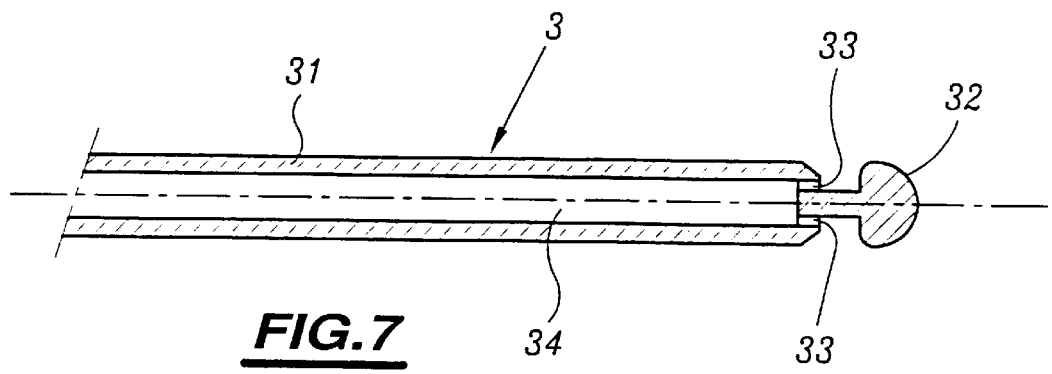
FIG. 7 is a diagrammatic longitudinal section of a filling cannula forming part of a plant according to the invention, in a first embodiment.

The carbon dioxide injection device 3 in FIG. 7 is a cannula intended for injecting liquid carbon dioxide into a casing with a valve or prescoring; this cannula has, over practically its entire length, a tubular body 31 of cylindrical general shape, one end (not shown) of which is intended to be connected to the carbon dioxide supply via a pipe passing through a control solenoid valve and the other end of which carries a head 32 joined to the body by a groove; the end of the body 31 carrying the head 32 has calibrated through-holes 33 emerging around the groove and distributed, at least approximately uniformly, around the latter (for example, four holes distributed at 900); the purpose of the holes 33 is to make the insider of the cannula, that is to say a longitudinal channel 34, communicate with the outside in order to inject the carbon dioxide into the casing when the head and part of the body of the cannula are inside the latter. The head has a rounded free end, for example in the form of a spherical or hemispherical cap, in order to gently push the valve 11 or the edges of the prescoring 13 in the casing during the approach of the casing contained in the drawer 21. This cannula is intended for filling casings whose passages allowing the gaseous carbon dioxide to escape are pores or perforations made for this purpose.

Figure 8:
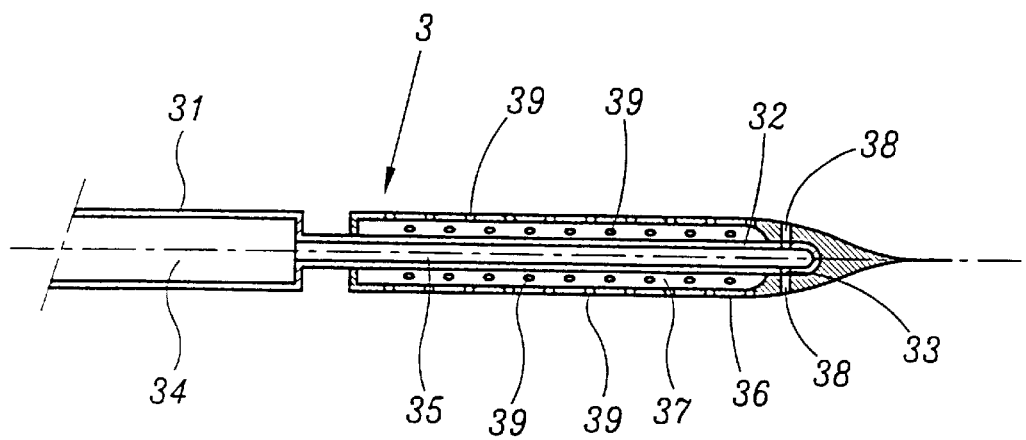
FIG. 8 is a diagrammatic longitudinal section of a filling cannula forming part of a plant according to the invention, in a second embodiment.

The device 3 in FIG. 8 also comprises a hollow body 31, but his body carries, at the opposite end to its end intended to be connected to the carbon dioxide supply, an elongate head 32 of smaller diameter which extends in line with the body 31 and which itself has a channel 35 coaxially aligned with the channel 34 in the body and being joined to it; in this case, the head also has a rounded end which may be hemisphereical; on the other hand, in this embodiment, it is not the body 31 which is pierced by carbon dioxide injection holes, rather the elongate head 32 is provided near its distal end with a few (for example four) calibrated through-holes 33 distributed approximately uniformly.

Since this embodiment is intended to be used with casings without any suitable perforation made beforehand, for the purpose of creating its own passage into the casing, it is equipped with a cutting tool 36, which may be interchangeable; this cutting tool 36 is produced in the form of a hollow blade inside which the elongate head 32, except for the region where it joins the body 31, is housed; as it is also intended to be used with casings that do not have pores or escape perforations, it is surrounded, except near its distal end, by an annular channel 37. The blade 36 is tapered, on the one hand, toward and beyond the distal end of the head 31 so as to present a cutting free end and, on the other hand, in cross section, on either side of the head 31, that is to say going toward the front and going toward the rear of the cutting plane in FIG. 8, so as to present two lateral cutting edges. The blade 36 is pierced with holes 38 opposite the holes 33 in the head in order to allow liquid carbon dioxide to pass into the casing; it is also pierced with holes 39 making the channel 37 communicate with the outside since, being intended to be used with a casing without significant pores or escape holes for the gaseous carbon dioxide, it must allow the surplus gaseous carbon dioxide to escape from the casing; by virtue of this structure, during its translational movement, the casing is pierced by the tapered end of the blade 36 and cut by the lateral cutting edges of the latter, and the translational movement of the casing is stopped when an appreciable part (for example two thirds) of the length of the blade 36 is inside the casing; liquid carbon dioxide is then transferred into the device 3 and can flow out into the casing via the holes 33 in the head and the holes 38 in the blade; the surplus gaseous carbon dioxide passes through those of the holes 39 in the blade in communication with the annular channel 37 which are inside the casing, travels along the annular channel 37 toward the body 31 and escapes to the outside via those of the holes 39 in the blade which are outside the casing.

Figure 9:
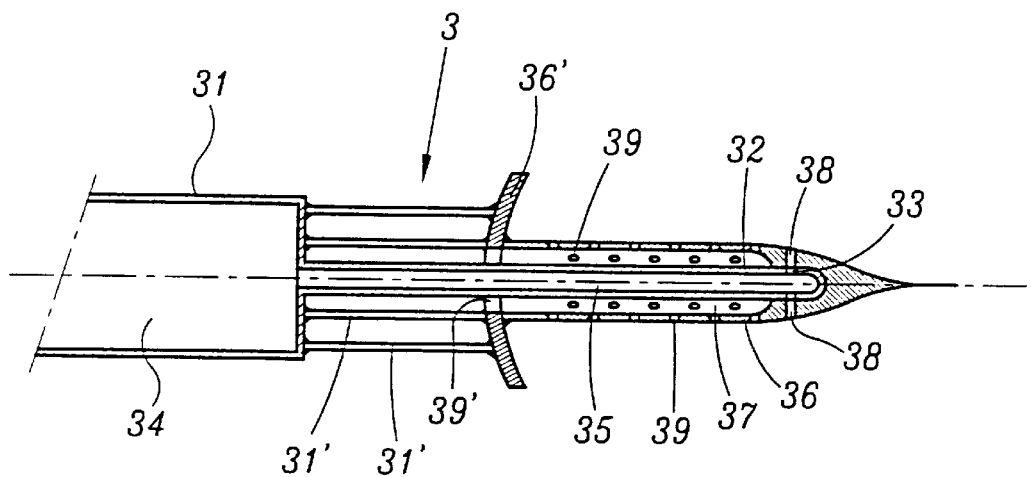
FIG. 9 is a longitudinal section of a filling cannula forming part of a plant according to the invention, in a third embodiment.

The injection device 3 in the embodiment in FIG. 9 is intended to be used here with casings that have rounded shapes, for example spherical shapes, in order to improve the relative positioning of the casing and the cannula. This embodiment has approximately the same structure as that in FIG. 8; however, it also includes a stop 36' intended to be applied against the casing and limiting the penetration of the elongate head 31 surrounded by the blade 37 in the casing 1 at the desired point. This stop 36' has a shape corresponding to that of the casing, in this case a spherical cap; in this embodiment, the blade 36 does not extend toward the body 31 between the stop 36' and the body, and it suffices for the stop to have an annular opening 39' around the head 31 and for the space between the stop and the body not to be entirely closed peripherally so that the gaseous carbon dioxide penetrating the annular channel 37 via the holes 39 can escape to the outside through the annular opening 39'; in the embodiment in FIG. 9, the stop 36' is supported by small rods 31' welded to the body 31 and forming, around the head 32, a squirrel cage through the spaces of which the gaseous carbon dioxide can escape; in order to make it easier to fix the small rods 31', the body 31 shown in FIG. 9 has a larger diameter than that in FIG. 8.

It may be noted that, because the surplus carbon dioxide gas (at −78.5° C.) is allowed to escape, the liquid carbon dioxide is subcooled and an efficiency of conversion into dry ice of treater than 47% is obtained.

FIGS. 10A to 10E relate more particularly to a spherical container, the casing 1 of which is made of polyethylene and has a diameter, for example, of about ten centimeters, that part of the plant for manufacturing this container which is illustrated being a variant similar to that described previously. This part of the plant allows the casings 1 to be partially housed in a box 2, one wall of which carries a carbon dioxide injection device 3, by means of a drawer 21, for puncturing these casings for injecting carbon dioxide and for discharging the containers consisting of the casing containing dry ice; the box and the drawer have a hemispherical general shape, the internal dimensions of which are designed to house, with a slight clearance, the spherical casings 1 and both of them can move translationally. Fastened to the back of the drawer 21 here is a cover having an approximately horizontal wall 24 extending level with the top of the drawer 21 and acting as a valve, as will be seen below.

A hopper 4 for feeding casings 1 is placed with its base slightly above the level of the wall 24, at a point such that the wall 24 closes off the base of the hopper, except when the drawer 21 is in a completely open position shown in FIG. 10E. A discharge well 5, placed between the box 2 and a point vertically below the hopper 4, emerges in its upper part level with the base of the box 2 and of the drawer 21; this upper part of the discharge well 5 is selectively closed off or exposed by a panel 23 forming a bottom which, here, is not able to slide as previously (FIGS. 4 to 6) but can pivot about a horizontal axis so as to be able to be retracted into the well in order to give the containers a passage during their discharge; the lower part of the well 5 emerges in a pan 6 from which the dry-ice containers may be removed, for example manually.

The succession of operations is as follows: with a spherical casing 1 half-housed in the drawer 21, the latter is moved, by sliding, toward the box 2 from inside which projects the injection device 3, here preferably as described with reference to FIG. 9, the panel 23 bing in its position for closing off the well 5 (FIG. 10A); at the end of the coming-together travel, the casing 1 is cut into by the device 3 and, when the drawer 21 is applied against the box 2, liquid carbon dioxide is injected; as soon as it penetrates the casing, the liquid expands, forming dry ice and carbon dioxide gas, the surplus of which can escape as was mentioned with reference to FIG. 9; throughout this time, the base of the hopper is closed off by the wall 24; when the casing is practically full (FIG. 10B), the drawer 21 is brought back from its closed position to its open position. Next, the box 2 is itself slid back toward the drawer 21 (FIG. 10C) until the dry-ice container (the casing filled with carbon dioxide) ends up above the pivoting panel 23. The panel or bottom 23 is then made to retract into the well 5, or else the weight of the container causes the bottom 23 to retract, and the container enters the well 5 (FIG. 10D), ending up in the pan 6. An additional rearward motion of the drawer 21 brings the wall 24 to a point where it no longer closes off the base of the hopper 4 and another casing 1 escapes from the hopper and becomes placed in front of the drawer 21 (FIG. 10E), and another cycle can start.

FIG. 11 shows the main elements of the entire automatic plant according to the invention that can be used as a free service by means of a "slot-payment mechanism." This FIG. 11 shows the box 2 into which emerges the carbon dioxide injection device 3 connected to a liquid carbon dioxide supply 7, such as a bottle of liquid carbon dioxide at a pressure of 20 bars, via a solenoid valve 8 activated in conjunction with a timer (not shown). The sliding drawer 21 is surmounted by the hopper 4 and the discharge well 5 emerges with its upper part under the drawer 21 and with its lower part in a pan 6. An extractor, for example a screw fan extractor 9, connected to the drawer 21, which has to be relatively impervious in order to form an almost confined space, is provided in order to discharge to the outside, by means of an outlet pipe, the carbon dioxide in the gaseous state contained in the drawer after it has been filled. Means (not shown) may be provided for warming certain elements of the box 2 and/or of the drawer 21 and/or of the injection device 3 (especially the head of the latter) in order to prevent the formation of water ice or carbon dioxide ice.

A control apparatus 10 is inserted into the well 5 or between the well 5 and the pan 6 in order to count the containers delivered, to display the result(s) of the counting (for example to display a daily result by means of a first display and a total result by means of a second display), and possibly to weigh the containers in order to check the operation of the plant.

A telesurveillance apparatus 11 makes it possible to check the casing storage level, the counting, the operation of an alarm and to detect any malfunction of the plant.

The hopper 4 may be designed to contain a few tens of casings and to receive an element that can be fitted onto it allowing the capacity to be tripled or quadrupled; it includes a filling detector and warning device (these not being shown) in order to warn the operator of the plant when the number of casings drops to about 10.

The process for manufacturing the containers used in the operation of this plant is as follows:

After inserting a token or a suitable coin, the drawer 21 is brought into a position allowing a casing to be introduced into it simply by dropping out of a hopper 4 under gravity. The casing is transferred to the liquid carbon dioxide injection 3 which possibly pierces it, unless this operation was carried out beforehand in the plant itself by an interchangeable tool, or outside the plant, the carbon dioxide is then allowed to flow out, after actuating the solenoid valve 8, for a time predetermined by the timer. After the predetermined time, the drawer is retracted and the container formed is discharged by simply dropping into the well 5 under gravity and from there into the pan 6 after a control phase as it passes through the control apparatus 10. Since the container is in the pan 6, it can then be removed. The time which elapses between inserting the token or coin and the arrival of the dry-ice container in the pan is only a few seconds, for example, approximately 7 seconds.

In the situation in which the plant is intended for public use, the operation is discontinuous and allows between about ten and about fifteen operations per hour over, for example, about twelve hours per day.

The plant may also be installed in a factory, in a version designed for continuous operation over, for example, seven hours per day or two periods of this case, the flow of the containers my be extended by a chute toward an overhead receptacle (for example about one meter overhead).

What is claimed is:

1. A dry-ice container comprising:
   a casing and, in this casing;
   carbon dioxide, part of which is in a solid state and another part of which is in a gaseous state, wherein said casing comprises at least one passage for insertion of a carbon dioxide injection device suitable for transferring carbon dioxide contained in a carbon dioxide supply into the casing and for spontaneous escape of carbon dioxide in the gaseous state.

2. The container according to claim 1, wherein the passage for inserting the injection device is unidirectional.

3. The container according to claim 1 wherein said casing is composed of a material that does not allow significant escape of carbon dioxide gas.

4. A process for manufacturing a dry-ice container comprising the steps of
   joining a casing defining an internal space and a device for injection of carbon dioxide under pressure in the liquid state, by passing the injection device through a passage in the casing, until at least one end region of the injection device is in the internal space of the casing;
   transferring carbon dioxide in the liquid state through the injection device to the internal space such that the carbon dioxide in the liquid state enters said internal space partly in a pulverulent solid state and partly in a gaseous state;
   allowing said gas phase to escape through said passage as the internal space is gradually filled with the pulverulent solid;
   stopping said transferring of carbon dioxide in the liquid state;
   removing the end region of the injection device from the internal space and moving the casing and the injection device apart.

5. The process according to claim 4, further comprising the steps of inserting said casing into a housing so as to face said injection device prior to said joining step.

6. The process according to claim 5, further comprising the step of discharging said casing containing the carbon dioxide in the solid state from said housing after said step of removing said casing and injection device apart.

7. The process according to claim 6 further comprising the step, after the step of discharging the casing from the housing, of allowing excess gas phase to escape via at least one passage in the casing.

8. The process according to claim 4, wherein said step of joining the casing and the injection device comprises moving at least one of them until at least one end region of the injection device is in the internal space of the casing.

9. The process according to claim 8, comprising moving the injection device into the passage of said casing.

10. The process according to claim 4, further comprising the step of supplying said liquid transferred through the injection from a supply.

11. Process according to claim 4, further comprising the step of cutting into said casing with said injection device in order to create said passage.

12. The process according to claim 4 wherein said injection device further comprises a stop that applies against the casing and limits penetration of the head of said injection device into said casing to a desired point.

13. A plant for the manufacture of a dry-ice container comprising:

a casing having a passage;

carbon dioxide in said casing, part of which is in a solid state; and an injection device for injecting carbon dioxide in a liquid state into the casing, wherein said injection device comprises a tubular body, a channel which extends along said tubular body, a head carried by the body, in order to pass through said passage in the casing, a channel for gaseous carbon dioxide to escape from said casing, and holes suitable for making the channel which extends along said tubular body communicate with the inside of the casing when the head is at least partially in the casing.

14. The plant according to claim 13, wherein said injection device further comprises a cutting tool for cutting into the casing, for the purpose of producing a through-passage therein.

15. The plant according to claim 13, further comprising a box, one wall of which carries the injection device, and a drawer that can move between an open position for putting in the casing, for the purpose of filling it, and a closed position for filling the casing, in which at least part of the head of the injection device is inside the casing.

16. The plant according to claim 15, further comprising a hopper including a base for feeding casings, wherein the drawer includes a top and carries a cover fastened to the back of the latter and having an approximately horizontal wall which extends level with the top of the drawer and is suitable for closing off the base of the hopper, except when the drawer is in the open position.

17. The plant according to claim 13, further comprising a panel suitable for forming a bottom for a sliding drawer, said panel itself sliding independently of the drawer.

18. The plant according to claim 13, further comprising a well for discharging the container, an upper part of which well is selectively closed off or exposed by a pivoting panel.

19. The plant according to claim 13, wherein the carbon dioxide injection device is connected to a carbon dioxide supply via a solenoid valve, and wherein the residual gaseous carbon dioxide in the plant is extracted therefrom via an extractor and the containers are sent to a pan from a discharge well via a counting apparatus.

20. The plant according to claim 15 wherein said injection device further comprises a stop that applies against the casing and limits penetration of the head of said injection device into said casing to a desired point.

* * * * *